United States Patent [19]

Fernandez et al.

[11] Patent Number: 4,840,056
[45] Date of Patent: Jun. 20, 1989

[54] FUEL MEASURING SYSTEM

[75] Inventors: Emilio A. Fernandez, Fairfax County, Va.; Angel P. Bezos, Montgomery County; Charles H. Kimball, Carroll County, both of Md.

[73] Assignee: Pulse Electronics, Inc., Rockville, Md.

[21] Appl. No.: 131,639

[22] Filed: Dec. 11, 1987

[51] Int. Cl.⁴ .................... G01F 23/18; G01F 23/14; G01F 25/00
[52] U.S. Cl. ........................ 73/1 H; 73/302; 364/509; 364/564; 364/575
[58] Field of Search ............... 73/299, 302, 149, 1 H; 364/509, 562, 564, 571, 575

[56] References Cited

U.S. PATENT DOCUMENTS

| | | | |
|---|---|---|---|
| 1,822,458 | 9/1931 | Rowland et al. | 73/302 X |
| 1,946,175 | 2/1934 | Murphy et al. | 73/299 |
| 3,262,313 | 7/1966 | Honna | 73/302 |
| 4,337,638 | 7/1982 | Leonard et al. | 73/1 H |
| 4,406,152 | 9/1983 | Palmer et al. | 73/1 H |
| 4,409,833 | 10/1983 | Thomson et al. | 73/302 |
| 4,454,799 | 6/1984 | Pirkle | 73/299 |
| 4,719,799 | 1/1988 | Wicks et al. | 73/302 |

Primary Examiner—Tom Noland
Attorney, Agent, or Firm—C. Lamont Whitham; Michael E. Whitham

[57] ABSTRACT

A fuel measuring system of the bubble type is adaptable for use with a plurality of tanks of predetermined differing geometries. The system employs at least two bubbling tubes located at predetermined locations in a tank. A predetermined volume flow of air is made to pass through each tube. Pressure transducers are used to periodically measure the air pressures supplied to the bubbling tubes. Temperature is also periodically sampled, and the pressure and temperature data is used by a microprocessor to make the necessary computations to first determine the averaged normalized air pressure and then the height of the fuel in the tank. In order to correlate the computed value of fuel height with the actual quantity of fuel in the tank, the microprocessor accesses data in a table lookup memory for the particular tank and performs calculations in order to derive the instantaneous volume of fuel in the tank. The instantaneous volume of fuel is then digitally filtered with two time constants, and the results of the digital filtering is used to determine whether fuel is being added to the tank at a rapid rate as in refueling or fuel is being drawn off the tank at a relatively slow rate as when fuel is being supplied to an engine. Depending on the results of the test, an approximate, but stable, value of fuel volume is generated for display.

12 Claims, 7 Drawing Sheets

FUEL MEASURING SYSTEM

BACKGROUND OF THE INVENTION

1. Field of the Invention

The present invention generally relates to liquid level measuring systems and, more particularly, to a bubble type fuel measuring system having specific application for measuring the quantity of fuel in tanks of railroad locomotives. A particular feature of the fuel measuring system according to the invention is that it can be used on a variety of locomotives made by different manufacturers.

2. Description of the Prior Art

There has been a continuing need in the railroad industry to develop an accurate fuel gauge. Over the years, there have been several attempts at gauging the amount of liquid in a tank. Early precursors of present day gauges used sight glasses affixed to the side of the tank which would fill with liquid to a level of the tank. A reading would then be taken correlating height of the liquid in the sight glass tube to gallons of liquid in the tank. The natural problems with this were sight glass damage or dirt contamination which caused an inability to read the gauge. Secondly, one had to be at eye level to the gauge to read it.

The second method employed was a mechanical type gauge which employed a float arrangement to move a needle, typically through a gear arrangement. As the liquid was expended, the float would move lower in the tank and therefore display less fuel. Problems with this design were that it would not withstand the effects of a "sloshing liquid" and the gear assembly or float/arm would become bent or broken. Secondly, irregular cross elevation of the track structure would cause the device to read inaccurately. Third, one also had to be at gauge level to read the device.

The third method of measuring liquid is a rather old idea and that is to pass a hollow tube vertically down through the tank and then pass air through the tube. Depending on the pressure needed to force air through the tube, a manometer type of gauge was hooked in parallel with the air source and vertical tube and the effective pressure was read with the use of a cross index scale on the gauge to read volume in the tank.

The fourth method of measurement employed is a pressure diaphragm that resides in the bottom of the tank itself and measures the pressure of the liquid. This pressure measurement is converted to volume or gallons.

The fifth method of measurement that has been employed is a capacitance type of system whereby a large open frame capacitor is placed inside the fuel tank. The liquid acts as a variable dielectric slug, with more or less capacitance according to the level of the liquid. The capacitor is placed in a bridge network and the current generated by the imbalance of the bridge is converted to a measure of volume, pounds or gallons.

Of these five systems, only the first four have been employed by the railroad industry. The first two while accurate have both logistic and physical problems; i.e., they are impossible to read from the locomotive cab and tend to be contaminated by dirt making reading difficult. The fifth method is employed extensively in the aircraft industry.

As mentioned, the third or bubble type liquid level measuring systems have been known for some time. In these systems, air under pressure is bubbled through the liquid in a tank. Depending on the amount of liquid in the tank, the geometry of the tank, the temperature of the liquid, among other factors, the pressure of the air bubbled through the tank will vary. For a particular application, all variables other than the quantity of the liquid must be held constant or some compensation provided so that a measurement of pressure will provide an accurate indication of the quantity of the liquid in the tank. Examples of bubble type liquid level measuring systems are disclosed in U.S. Pat. No. 3,262,313 to Hanna and U.S. Pat. No. 4,409,833 to Thomson et al. Neither of these patents are directed to a liquid level measuring system having specific application to railroad equipment.

U.S. Pat. No. 4,454,759 to Pirkle discloses a fuel gauge for locomotives which may be generally characterized as of the pressure transducer type, that is, the fourth type described above. U.S. Pat. No. 1,946,175 to Murphy et al. discloses a water level indicator in a railroad tank car. Like the Pirkle fuel gauge, the Murphy et al. indicator is of the pressure transducer type.

Other bubble type gauges are known in the prior art, but these are designed to measure other properties of a liquid rather than the level or quantity of the liquid. For example, U.S. Pat. No. 1,822,458 to Rowland et al. discloses a bubble type gauge which is designed to measure the density of the liquid.

What is needed in the railroad industry is a device that contains the minimum amount of retrofitting of the fuel tanks to operate. Any system that employs the diaphragm or pressure transducer technology, i.e., the fourth method described above, or the capacitor technique, i.e., the fifth method described above, necessarily must have a portion of the package inside the tank. This means a method for placing it in the tank and the problems inherent in equipment failures and repair in that medium. There are of course other technologies which could be employed such as, for example, sonar or radar, but these would suffer much the same problems as far as retrofit requirements and industry acceptance.

SUMMARY OF THE INVENTION

It is therefore an object of the present invention to provide an improved liquid level measuring system of the bubble type.

It is another and more specific object of the invention to provide a fuel measuring system of the bubble type which may be manufactured for general application on a plurality of different types of locomotives and customized for use in a specific locomotive.

According to the invention, a liquid level measuring system is provided wherein a plurality of air hoses are attached to bubbling tank tubes mounted at predetermined locations to a tank containing a liquid, the level of which is to be measured. A predetermined volume flow of air is made to pass through each hose, and to maintain the flow of air constant, a separate air flow controller is inserted between each air hose, and high pressure air generated by the locomotive. These controllers deliver a constant flow to their respective hoses, independent of the liquid level in the tank, such that the air pressure in the hose is equal to the liquid pressure at a constant height, which may be approximately 1.75", above the bottom of the tank. Pressure transducers are provided for each of the hoses to generate electrical signals proportional to the respective air pressures in the hoses.

The electrical signals from the pressure transducers are converted to digital representations and supplied to a microprocessor. The microprocessor makes the necessary computations to determine the average liquid pressure as indicated by the air pressure in each of the air hoses. Then it computes the value of the liquid level. In order to correlate the computed value with the actual quantity of liquid in a particular tank, the microprocessor accesses data in a table lookup memory for the particular tank and performs calculations using that data and the computed liquid level value in order to produce an output that accurately represents the quantity of liquid in the tank. Thus, for the fuel tank of a specific locomotive, the make and model of the locomotive, and hence the particular fuel tank, must be identified to the microprocessor. This is done by means of thumbwheel switches which allow the installer of the system to dial in the necessary information. Based on the completed computations, the microprocessor provides outputs which drive a display on the control box above the locomotive tank and, optionally, are transmitted to a remote location or locations in the locomotive cab or elsewhere, either by line drivers or over a wireless link.

BRIEF DESCRIPTION OF THE DRAWINGS

The foregoing and other objects, aspects and advantages of the invention will be better understood from the following detailed description of a preferred embodiment with reference to the drawings, in which.

DETAILED DESCRIPTION OF THE PREFERRED EMBODIMENT OF THE INVENTION

Figure 1:
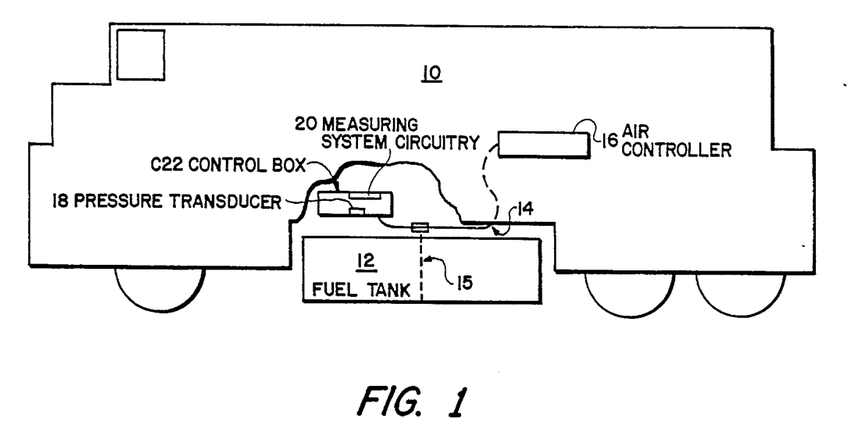
FIG. 1 is a side view of a locomotive showing its fuel tank having an air line attached for the fuel measuring system according to the invention.

Referring now to the drawings, and more particularly to FIG. 1, there is shown a locomotive 10 having a fuel tank 12. The fuel measuring system according to the invention is provided with an air line 14 attached to the tank tube 15. An air controller 16 supplies air flow to air line 14 so as to maintain a constant volume flow of air through the tank tube 15. The more fuel in the tank, the greater the air pressure must be to maintain the air flow and, conversely, the less fuel in the tank, the less the air pressure must be to maintain the air flow. Attached to the air line 14, in control box 22, is a pressure transducer 18 which measures the air pressure and provides an electrical signal proportional to the measured pressure. This signal is provided to the fuel measuring system circuitry 20 which generates a display on the control box C22 above the locomotive fuel tank 12.

Figure 2:
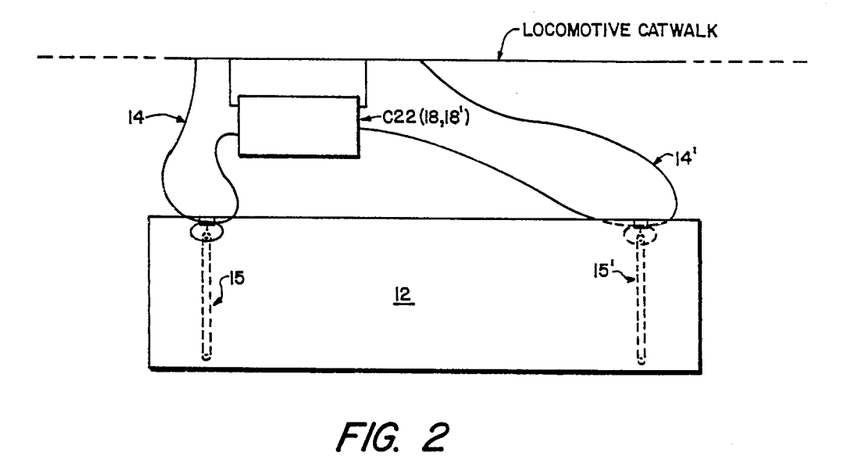
FIG. 2 is a side view of the fuel tank showing in greater detail the locations of two air lines and tank tube attached to the fuel tank.
Figure 3A:
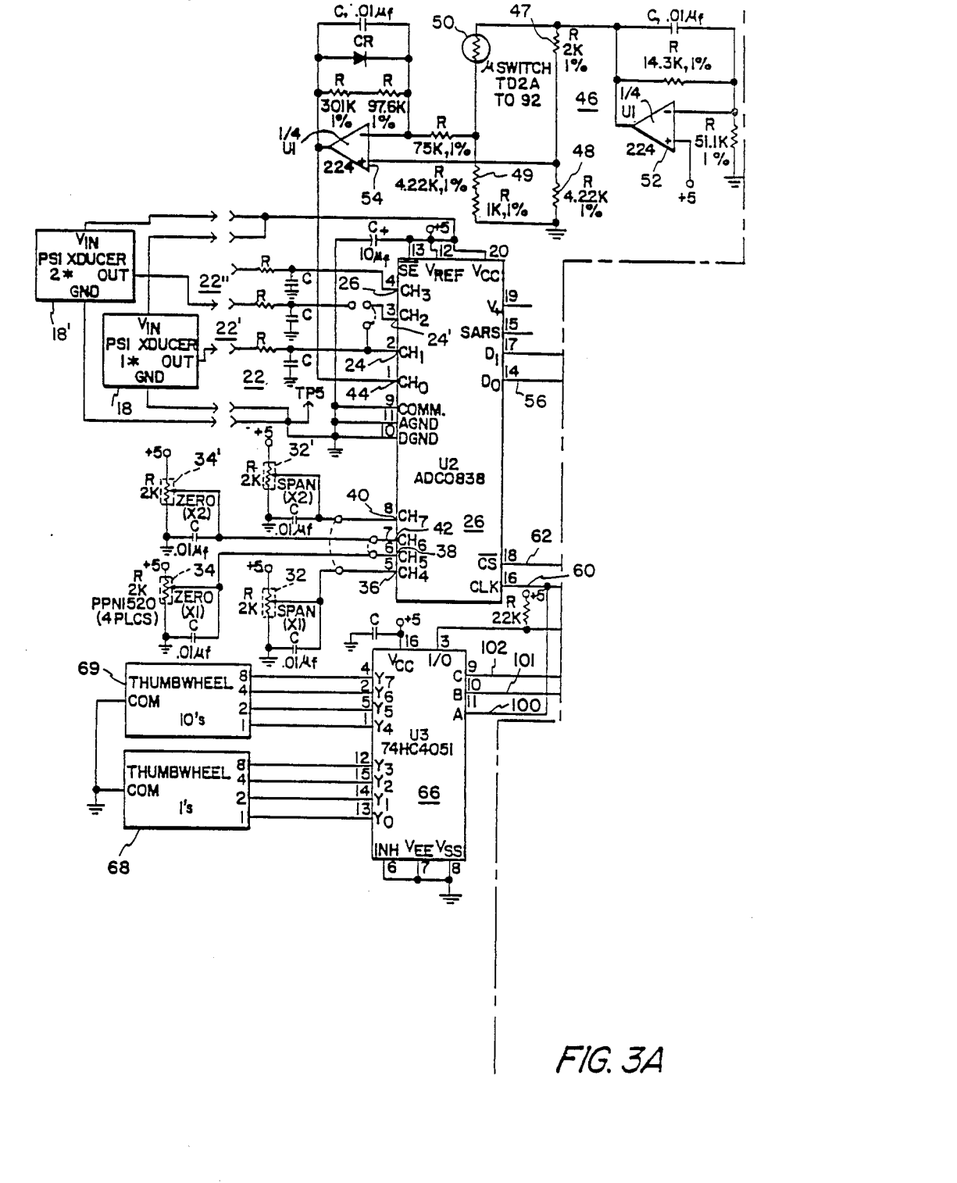
FIGS. 3A-3D collectively show a block and schematic diagram of the fuel measuring circuitry according to the invention.
Figure 3B:
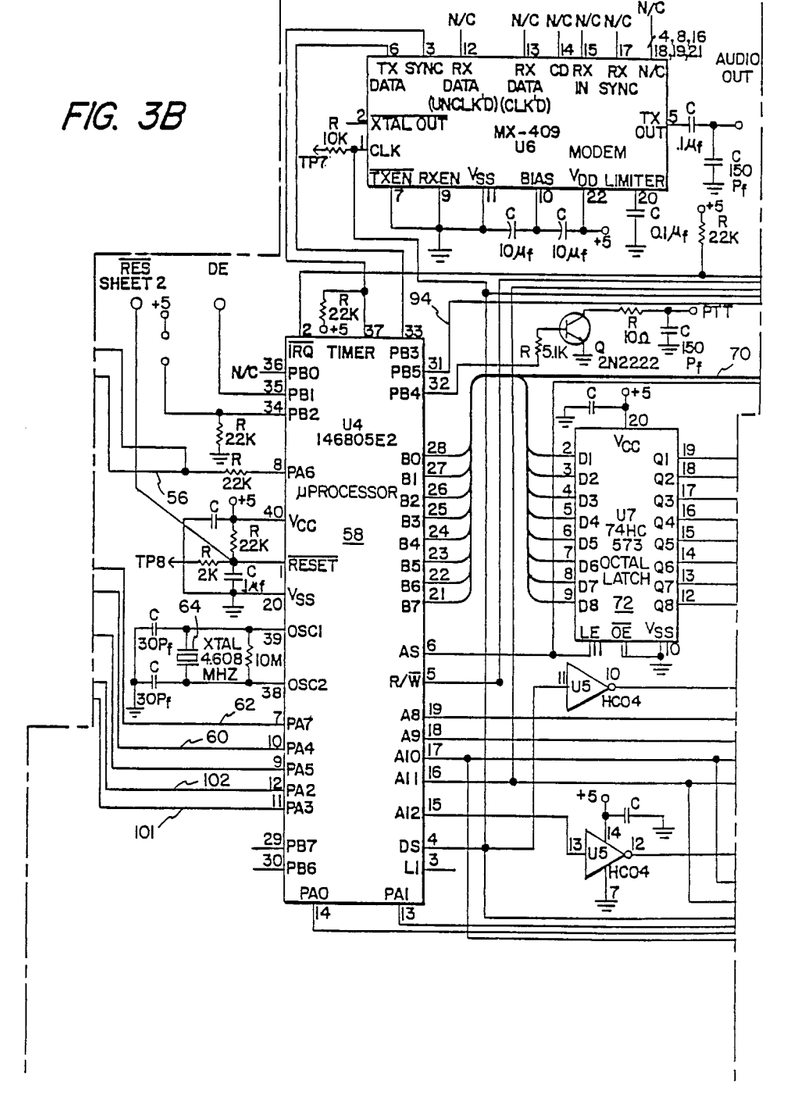
Figure 3C:
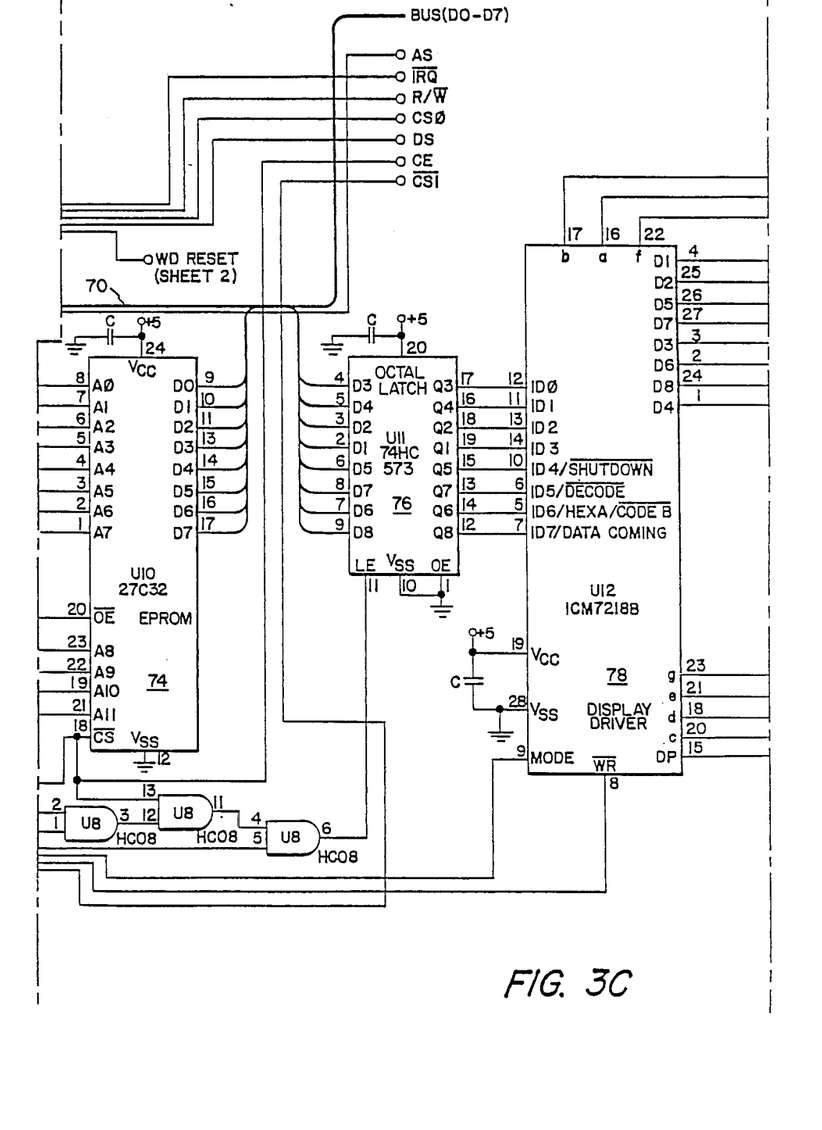
Figure 3D:
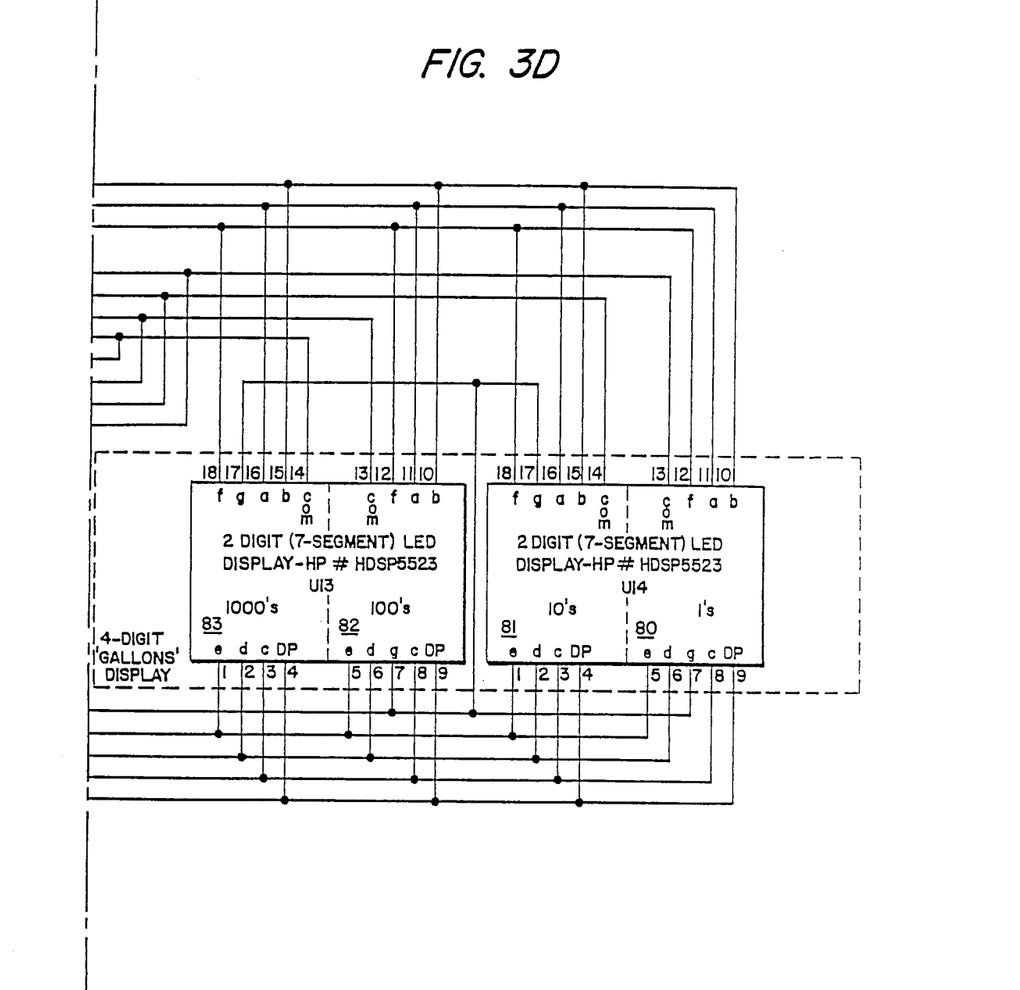

For the system as thus far described to work properly under all conditions, the tank tube 15 must be perfectly centered in the fuel tank 12 and the fuel in the tank must be perfectly still or not moving. As a practical matter, these conditions do not exist in real life. For one thing, the fuel tanks manufactured by locomotive manufacturers such as General Motors and General Electric, the two biggest manufacturers of locomotives, have irregular shapes which prevent the central mounting of a tank tube. Moreover, when a locomotive is under way, the fuel is in constant movement within the tank 12 as the locomotive rolls, pitches, accelerates and decelerates, and this movement can become quite extreme as the tank empties. The tanks are provided with both longitudinal and transverse baffles to minimize the movement, but the fuel movement is still significant. Therefore, the arrangement shown in FIG. 1 is modified as shown in FIG. 2 to include at least two tank tubes 15 and 15' and two air lines 14 and 14' which are generally located on a diagonal or diagonals of the tank at convenient locations for a specific tank design. Each of the air lines is provided with respective pressure transducers 18 and 18' in control box C22.

Turning now to FIG. 3 of the drawings, there is shown the basic block and schematic diagram of the fuel measuring system circuitry according to the preferred embodiment of the invention. The two pressure transducers 18 and 18' are connected through respective RC low pass filters 22 and 22' to first and second channel inputs 24 and 24' of an eight channel analog-to-digital converter 26. The analog-to-digital converter 26 may be an ADC0838 converter manufactured, for example, by National Semiconductor or Texas Instruments. A third channel input 28 to converter 26 is provided for a test point 30 having its own RC low pass filter 22''.

Span and zero potentiometers 32 and 34 for adjusting the span and zero settings of the output of pressure transducer 18 are connected respectively to fourth and fifth channel inputs 36 and 38 of analog-to-digital converter 26. In like manner, span and zero potentiometers 32' and 34' for adjusting the span and zero settings of the output of pressure transducer 18' are connected respectively to seventh and sixth channel inputs 40 and 42 of converter 26. Finally, the zeroth channel 44 of the converter 26 is connected to receive a temperature compensation signal from temperature measuring circuit 46.

The temperature measuring circuit 46 is basically a bridge circuit comprising three fixed resistors 47, 48 and 49 and a temperature sensing resistor 50. An operational amplifier 52 with a feed back capacitance provides a low pass filtered voltage across one diagonal of the bridge, and a second operational amplifier 54 is connected with its inputs across the other diagonal of the bridge to measure any imbalance due to a change in the value of the resistance of temperature sensing resistor 50. The two operational amplifiers 52 and 54 may be LM224J opamps manufactured, for example, by National Semiconductor, RCA or Texas Instruments.

The eight channels of the analog-to-digital converter 26 are multiplexed to a single serial digital input/output 56 to a microprocessor 58, which may be an MC146805E2 microprocessor manufactured by Motorola. Microprocessor 58 can, in addition, supply serial digital information to the converter 26 via the input/output 56. Microprocessor 58 also supplies clock pulses and a chip select on lines 60 and 62 to the converter 26. The clock signal is generated by software and an externally connected crystal 64 having a frequency of oscillation of 4.608 MHz.

In addition to the inputs provided by the analog-to-digital converter 26, the microprocessor 58 receives input from an eight channel analog multiplexer 66, which may be a 74HC4051 multiplexer manufactured by National Semiconductor. The multiplexer 66, in turn, receives as inputs the outputs from units and decades thumbwheel switches 68 and 69, respectively, and three channel select signals 100, 101 and 102 from the microprocessor 58. Basically, the thumbwheel switches 68 and 69 provide a binary-coded decimal input to the multiplexer 66, and the multiplexer 66 provides output I/O to the microprocessor 58. The microprocessor 58 sets the A, B and C inputs (100, 101 and 102) to the multiplexer 66 to determine which switch is being read. The purpose of the thumbwheel switches 68 and 69 is to allow identification of the make and model of the locomotive to be entered so that the microprocessor will be able to properly compute the fuel quantity for the tank of that locomotive.

The 8-bit input/output bus 70 of the microprocessor 58 is connected to a first octal latch 72, which may be a 74HC573 latch manufactured by National Semiconductor. The octal latch 72 is connected to the address lines of a nonvolatile storage 74, such as electronically programmable read only memory (EPROM) such as a 27C32 EPROM manufactured by National Semiconductor or Mostek. The nonvolatile storage 74 stores the object code that controls the microprocessor 58. During the address part of the microprocessor bus cycle, the octal latch 72 stores the lower eight bits of the address outputted by the microprocessor. In this way, the address is available to the nonvolatile storage 74 during the data part of the bus cycle.

The bus 70 is further connected to a second octal latch 76 of similar type and manufacture as latch 72. This second octal latch 76 is connected to the control/data inputs of a display driver 78, which may be a ICM7218B display driver manufactured by Intersil or Maxim. This integrated circuit is a direct drive multiplexed display driver in which the microprocessor 58 writes the information to be displayed in the driver's memory, and the driver 78 provides multiplexed outputs to drive individual segments of 7-segment light emitting diode (LED) displays 80, 81, 82, and 83 providing, respectively, units, tens, hundreds, and thousands decimal outputs for viewing external to the control box 22. The LED displays may be, for example, HDSP5523 LED displays manufactured by Hewlett-Packard.

The basic operation of the fuel measuring system as thus far described is controlled by the microprocessor 58 and its stored program in the nonvolatile storage 74. The inputs from thumbwheel switches 68 and 69 identify the particular make and model of the locomotive, and hence the specific fuel tank, on which the fuel measuring system is installed. This information is used by the microprocessor 58 to access the correct data stored in look up table form in nonvolatile storage 74 based on the results of computations performed. The two pressure transducer inputs allow the microprocessor to compute an averaged or mean value which is compensated for variations in temperature.

Figure 4:
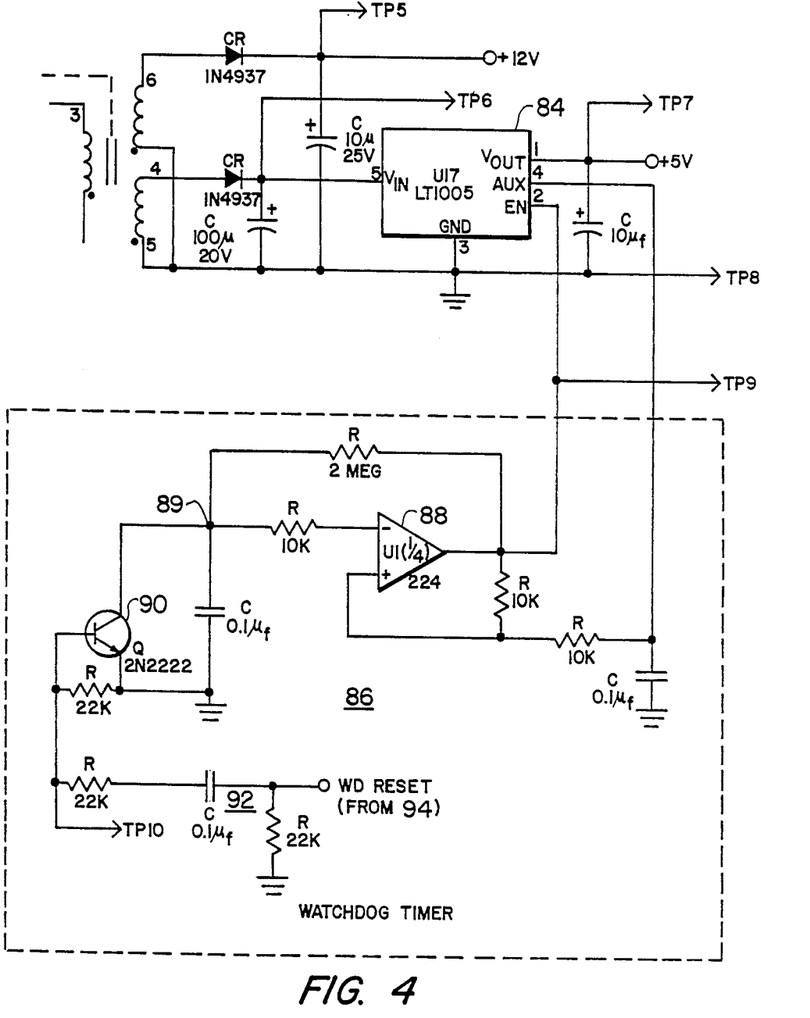
FIG. 4 is a block and schematic diagram of the watchdog timer feature of the fuel measuring circuitry shown in FIG. 3 (how FIGS. 3A-3D are hereafter referenced)

A fail-safe feature of the fuel measuring system is provided by the circuit shown in FIG. 4 which comprises a voltage regulator 84, such as an LT1005 regulator manufactured by Linear Technology, and a watch dog timer 86. The watch dog timer itself comprises an operational amplifier 88, of similar type and manufacture as opamps 52 and 54 of the temperature compensation circuit, and an NPN transistor 90 having its collector connected to the summing junction 89 of the operational amplifier 88 and its emitter connected to circuit ground. The base drive for NPN transistor 90 is provided via an RC differentiating circuit 92 by the WD reset output 94 from microprocessor 58. The output of operational amplifier 88 is connected to the enable input of the voltage regulator 84.

As long as the output of operational amplifier 88 remains high, the regulator 84 remains enabled and the supply voltage to the microprocessor remains on. The output of operational amplifier 88 will remain high as long as the WD reset signal from microprocessor 58 is the correct frequency and duty cycle. In the preferred embodiment, the correct frequency is approximately 20 Hz and the duty cycle is low approximately 40 msec and high approximately 3 msec. The microprocessor software is written so that these conditions are always true as long as the microprocessor 58 is functioning correctly and will probably not be true if the microprocessor 58 has "crashed"; i.e., gone into a latch-up condition. In this way, if there is a software malfunction, eventually the output of the watchdog timer 86 operational amplifier 88 will go low causing the voltage output from regulator 84 to turn off. This condition prevails until the operational amplifier 88 times out and its output again goes high. Then the voltage output from the regulator 84 turns back on, and the microprocessor goes through its power-up reset routine and should start functioning correctly again.

Figure 5:
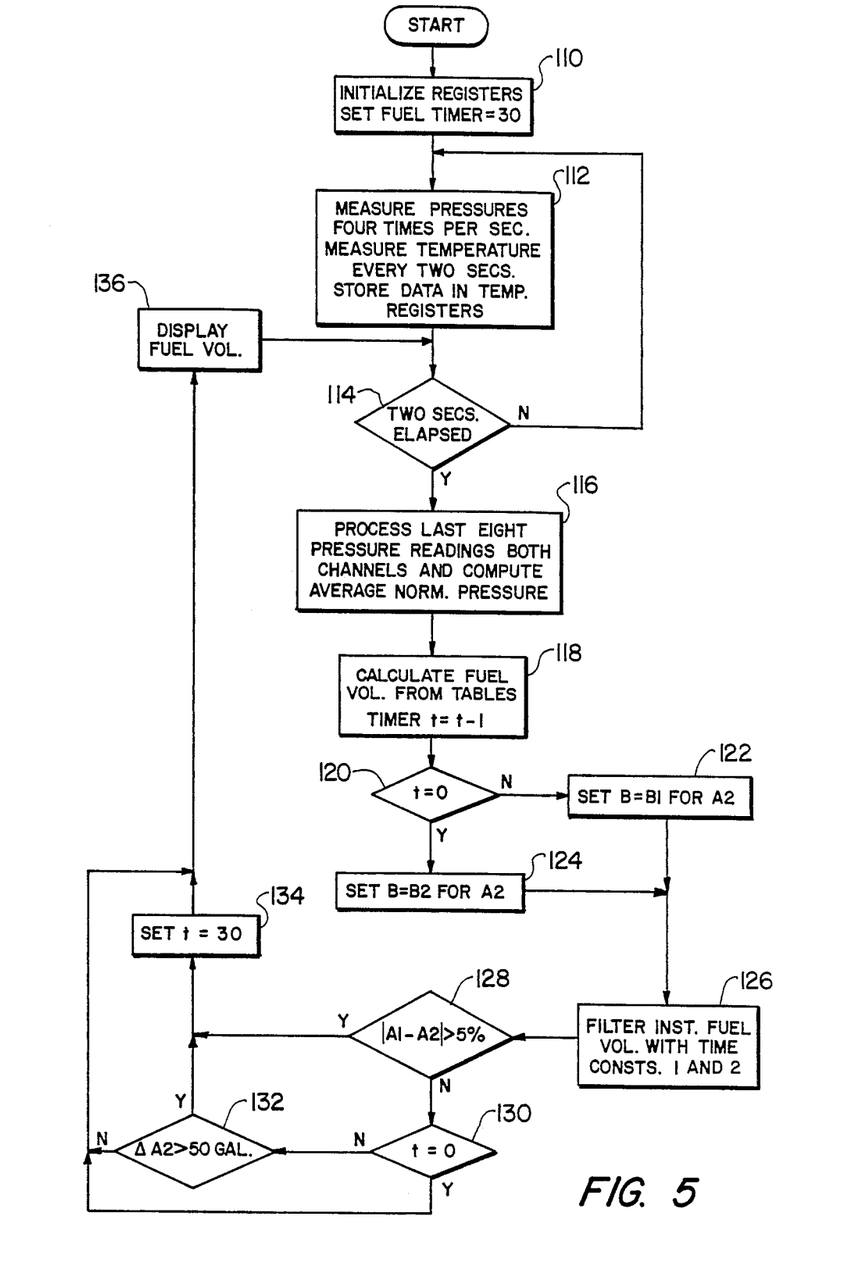
FIG. 5 is a flow diagram showing the logic of the program that the microprocessor uses in the fuel measuring circuitry of the invention.

The operation of the system will be better understood with reference to FIG. 5, which is a flow diagram of the computer program that controls microprocessor 58, and the following example calculations. The process begins by initializing the registers of the microprocessor and setting a timer, called FUEL.TIMER to 30, as indicated in function block 110. The purpose of the FUEL.TIMER is to control a digital filtering algorithm at a later point in the program, as will become clear as the description progresses. The system continuously measures fuel or, more precisely, air pressure in the two channels at the rate of four times per second. Temperature is continuously measured at the rate of once every two seconds. This sampling is accomplished by the analog-to-digital converter 26 under control of the clock signal supplied by the microprocessor 58. The sampled air pressure is a number from 0 to 255, and the sampled temperature is also a number from 0 to 255, but temperature is limited to a change of no more than 1 out of 255 (approximately 1° to 2° F.) every two seconds. For purposes of this description, the value of temperature will be referred to as F, rather than a number from 0 to 255. These sampled values are stored in temporary registers in the microprocessor, as indicated by function block 112.

Every two seconds, as indicated by the test in decision block 114, the air pressure for the last eight readings for both channels are processed in function block 116. Specifically, the highest and lowest readings are thrown out. The remaining six readings are averaged. Then from the zero and span calibration potentiometers 32, 32', 34, and 34', zero and span values are derived. Specifically, a number from 9 to 57, here referred to as $X_1$, is subtracted from the resultant average. Then another number from 207 to 255, here referred to as $X_2$, has $X_1$ subtracted from it, and the result is divided into the difference of the resultant average and $X_1$. The numbers for $X_1$ and $X_2$ are initialized at the beginning of each "run" of the program and not changed before the end of that run. The number for $X_1$ is the zero pressure reading of the pressure transducer, which is a factory calibration. The second one, $X_2$, is the full-scale point (1.30 psi, also factory calibrated) of the pressure transducer. Next, the "ideal span" ($X_3=204$) is multiplied times the calculated quotient to produce a "normalized" pressure reading, $P_N$, which is the same for the same pressure, independent of zero and full-scale points of each particular pressure transducer. The "normalized" pressure reading for each channel is then averaged to produce an average "normalized" pressure reading.

As a specific mathematical example, consider the following eight pressure readings:

$$P_1 = 190 \quad P_2 = 177 \quad P_3 = 185 \quad P_4 = 175$$
$$P_5 = 191 \quad P_6 = 180 \quad P_7 = 179 \quad P_8 = 182$$

$P_4$ and $P_5$ are thrown out (high and low readings) and the rest are averaged:

$$\frac{P_1 + P_2 + P_3 + P_6 + P_7 + P_8}{6} = 182$$

Next, zero and span computations are made to arrive at a normalized pressure, $P_N$:

$$P_N = (182 - X_1)\left(\frac{X_3}{(X_2 - X_1)}\right)$$

As a specific example, assume that $X_1 = 26$ and $X_2 = 220$, then $$P_N = (182 - 26)\left(\frac{204}{(220 - 26)}\right)$$
$$P_N \cong (182 - 26)$$
$$P_N = 164$$

The "ideal span" (204)=1.30 psi, so from an initial average reading of 182, the computed normalized pressure, $P_N$, is 1.05 psi.

All of the foregoing calculations are done for two channels, i.e., the two pressure transducers, to produce a new $P_N$ every two seconds. Once the two normalized pressures are calculated for each channel, they are averaged, and this averaged normalized pressure is then used to derive an "instantaneous fuel volume", as indicated in function block 118. First, the height of the fuel in the tank is calculated by multiplying the averaged normalized pressure, $P_N$, by inches/psi. Inches/psi is a variable function of temperature. At 77° F.=25° C., inches/psi is 32.53 inches/psi. For each 12° F. temperature change, inches/psi changes, with hysteresis, as illustrated by the following example:

$$
\begin{array}{llll}
T_1 & = 79° F. & => \text{inches/psi} & = 32.53 \\
T_2 & = 80° F. & => \text{inches/psi} & = 32.53 \\
T_3 & = 81° F. & => \text{inches/psi} & = 32.53 \\
| & | & | & | \\
T_{11} & = 89° F. & => \text{inches/psi} & = 32.53 = 32.66 \\
| & | & | & | \\
T_{23} & = 101° F. & => \text{inches/psi} & = 32.53 = 32.78
\end{array}
$$

From 89° F., for example, inches/psi will remain at 32.66 until the temperature decreases to 77° F., where it will again be 32.53.

Now assuming temperatue is 65° F., inches/psi=255/256 32.53=32.40 inches/psi, and the height of the fuel is H=1.05 psi×32.40 inches/psi=33.86 inches. Actually, the height of the fuel is H+1.8 inches. This is because the tank tubes are drilled out for bubbling approximately 1.8 inches above the bottom of the tank. The total usable fuel at that point is approximately zero so the calculated height, H, is sufficiently accurate.

Once the fuel height is derived, fuel volume is calculated by the geometry of whatever tank is specified by the thumbwheels 68 and 69. Specifically, each tank has six numbers stored in EPROM which are used by the microprocessor 58 to determine fuel volume from the calculated fuel height. These numbers are as follows:

$N_1$=total fuel volume (capacity) of tank
$N_2$=1/5th's inches of linearization point 1
$N_3$=1/5th's inches of linearization point 2
$N_4$=1/5th's inches of linearization tank top
$N_5$=percent $N_1$ at height $N_2$
$N_6$=percent $N_1$ at height $N_3$ Note: There is no $N_7$ since it is 100% For the foregoing numbers, a linearization point is composed of two coordinates the first being 1/5th's inches and the second being percent of total fuel at that height.

For our example, $N_0=5\times(33.86)=169$, and the percentage of the tank filled is calculated as follows:

For an SD50 tank, $N_1=4510$, $N_2=46$, $N_3=156$, $N_4=179$, $N_5=60$, and $N_6=227$; therfore, $$\% \text{ (tank full)} = \frac{C_1 + \left(\left(\frac{(N_0 - C_2)}{(C_3 - C_2)}\right)(C_4 - C_1)\right)}{256}$$

In this case, $N_0=169$, $C_2=N_3$, $C_1=N_6$, $C_3=N_4$, and $C_4="N_7"=256$; therfore, $$\% \text{ (tank full)} = \frac{227 + \left(\left(\frac{(169 - 156)}{(179 - 156)}\right)(256 - 227)\right)}{256}$$

$$\% \text{ (tank full)} = 95.1\%$$

Instantaneous fuel volume, $F_I$, follows directly:

$$F_I = 0.951 \times 4510 \text{ gal.} = 4288 \text{ gal.}$$

Once the instantaneous fuel is derived, actual fuel filtering begins and, preparatory to filtering, the timer is decremented by one in function block 118, unless the timer is zero.

The filtering algorithm is also run once every two seconds. More specifically, the algorithm is a digital implementation of a first-order exponential response; therefore, the output (gallons displayed) is not equal to the input unless the input remains stable for a period of time much greater than the time constant, $\tau$, of the system.

In this system, there are actually two outputs, accumulator one, $A_1$, and accumulator two, $A_2$, with corresponding time constants $\tau_1$ and $\tau_2$. For arbitrary constants $B_1$ and $B_2$, the filtering systems can be described mathematically as follows for $0 < B < 1$:

$$A_{next} = (B \times F_I) + (1 - B) A_{present}$$

The initial values of $A_1$ and $A_2$ are zero, and $$B_1 = \frac{46}{256} \text{ and } B_2 = \frac{1}{256}.$$

The output of $A_2$ is always displayed by the fuel measuring system while in the gallons display mode. $B_2$ is not, however, always used to calculate $A_2$, although it is most of the time. $B_1$ is used some of the time to calculate $A_2$ and all of the time to calculate $A_1$. The rules for when $B_1$ or $B_2$ are used for calculating $A_2$ are implemented by the next series of tests beginning with decision block 120.

Initially, the FUEL.TIMER is set to 30 in function block 110, but it is decremented by one each time the algorithm is run. Since the algorithm is run every two seconds, the timer is generally decremented to zero in sixty seconds time. However, as long as FUEL.TIMER is not zero, $B_1$ is used to calculate $A_2$ instead of $B_2$, as indicated by function block 122; otherwise, $B_2$ is used, as indicated by function block 124. The computations for $A_1$ and $A_2$ are performed in function block 126.

FUEL.TIMER may be reset to 30 at particular times. Since the filter calculations are done every two seconds, setting FUEL.TIMER to 30 means that $B_1$ will be used for the next sixty seconds, or longer. In addition to power up in function block 110, the conditions for setting FUEL.TIMER to 30 are as follows:

(1) Whenever $|A_1 - A_2| \geq 5\%$ of tank capacity; i.e., when $|A_1 - A_2| \geq 12/256 \times N_1$.

(2) If FUEL.TIMER is not zero, then whenever $A_2$ changes by at least 50 gallons from its value when FUEL.TIMER was most recently set to 30. This means, effectively, that FUEL.TIMER will not go to zero (after being non-zero) until the rate of change of fuel (dA/dt) drops below 50 gallons/min.

The first test is made in decision block 128 after $A_1$ and $A_2$ have been calculated, and if this test is positive, FUEL.TIMER is set to 30 as indicated in function block 134; otherwise, a test is made in decision block 130 to determine if FUEL.TIMER is not zero. This is the same test made in decision block 120 and need not actually be repeated, it being only necessary to check the outcome of the previous test by checking to see if a flag has been set. If FUEL.TIMER is not zero, then a test is made in decision block 132 to determine if the change in $A_2$ is 50 gallons or more, and if so, FUEL.-TIMER is set to 30 in function block 134. The filtered fuel calculation is displayed in function block 136 before control loops back to decision block 114.

The reason for the two time constant filtering is to automatically distinguish between the two cases of adding fuel to the tank (short time constant) and supplying fuel to the engine while under way (long time constant). As mentioned, only the filtered calculation for $A_2$ is displayed, but its time constant is changed so as not to provide a reading of large fluctuation during refueling. The system automatically senses refueling by the tests made in decision blocks 128 and 132 and forces the appropriate change in time constant by resetting FUEL.TIMER to 30.

While the invention has been described in terms of a single preferred embodiment which is believed to be the best mode of practicing the invention, those skilled in the art will recognize that the invention can be practiced with modification within the spirit and scope of the appended claims.

Having thus described our invention, what we claim as novel and desire to protect by Letters Patent is as follows:

1. A fuel measuring system of the bubble type comprising:

at least first and second bubbling tank tubes mounted at predetermined locations in a tank containing a liquid;

means for passing a predetermined constant volume of air through each of said bubbling tank tubes;

means for periodically measuring the pressure of the air supplied to each of said bubbling tank tubes and generating pressure data corresponding to the measured pressures for each of said bubbling tank tubes;

microprocessor means receiving said pressure data and programmed to compute a normalized pressure value for each of said bubbling tank tubes, averaging said normalized pressure values and then, using the averaged normalized pressure value, deriving the instantaneous volume of fuel in the tank; and display means responsive to said microprocessor means for displaying the amount of fuel in the tank.

2. The fuel measuring system recited in claim 1 further comprising means for periodically measuring the temperature and generating temperature data, said microprocessor being programmed to use both said averaged normalized pressure values and said temperature data to derive the instantaneous volume of fuel in the tank.

3. The fuel measuring system recited in claim 2 further comprising memory means for storing temperature values, a temperature value corresponding to a measured temperature being used to multiply the averaged normalized pressure value to yield the height of the fuel in the tank.

4. The fuel measuring system recited in claim 3 wherein said memory means further stores data describing the geometry of a plurality of predetermined tank types, said system further comprising means for specifying the tank type to which the fuel measuring system is attached, said means for specifying generating geometry data used by said microprocessor means to calculate the volume of fuel in the tank based on the height of the fuel in the tank.

5. The fuel measuring system recited in claim 4 further comprising zero and span calibration means for each of said bubbling tubes in the tank, said zero and span calibration means generating data used by said microprocessor means to calculate the averaged normalized pressure.

6. The fuel measuring system recited in claim 5 wherein said microprocessor means is further programmed to digitally filter the instantaneous volume of fuel with two time constants, and based on the results, to determine whether the fuel in the tank is increasing at a rapid rate, indicating refueling of the tank, or decreasing at a slower rate, indicating drawing off of the fuel to supply an engine, said microprocessor supplying said display means with data which is approximate but relatively stable indicating the volume of fuel in the tank for either of the two conditions of refueling the tank or drawing off of fuel to supply the engine.

7. A process for determining the amount of fuel in a tank comprising the steps of:
   providing at least two bubbling tubes at predetermined locations within the tank;
   supplying said bubbling tubes with a constant volume flow of air;
   periodically measuring the pressure of the air supplied to each of said bubbling tubes;
   normalizing a plurality of measured pressures for each of said bubbling tubes and averaging the normalized pressures to produce an averaged normalized pressure; and
   using said averaged normalized pressure, deriving the height of the fuel in the tank.

8. The process of claim 7 further comprising the steps of:
   periodically sampling the temperature to generate a temperature multiplier;
   storing said multiplier in a memory;
   multiplying said averaged normalized pressure by said multiplier stored in memory to derive the height of the fuel in the tank.

9. The process of claim 8 further comprising the steps of:
   storing data describing the geometric shapes of a plurality of tanks in a tank table;
   setting an input address for accessing the data for a specific tank in said tank table; and
   using the data for a specific tank and the height of fuel in the tank to derive the instantaneous volume of fuel in the tank.

10. The process of claim 9 further comprising the steps of:
    digitally filtering the instantaneous volume of fuel in the tank to generate an approximate volume of fuel; and
    displaying the approximate volume of fuel.

11. The process of claim 10 wherein the step of digitally filtering comprises the steps of:
    filtering the instantaneous volume of fuel with two different time constants, one relatively long and the other short;
    testing the resultant filtered values to determine whether fuel is being added to the tank at a relatively rapid rate or being drawn off the tank at a relatively slow rate; and
    selecting a filtered value for display which is stable depending on the results of the test.

12. The process of claim 11 further comprising the step of setting zero and span calibration values for each of said bubbling tubes, said zero and span calibration values being used to produce said normalized pressures.

* * * * *